(12) United States Patent
Lam et al.

(10) Patent No.: US 6,924,931 B1
(45) Date of Patent: Aug. 2, 2005

(54) LINE OF SIGHT ADJUSTMENT FOR NIGHT VISION BINOCULARS

(75) Inventors: Brian C. Lam, Roanoke, VA (US); Lapthe C. Flora, Roanoke, VA (US); John C. Nelson, Salem, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/653,768

(22) Filed: Sep. 3, 2003

Related U.S. Application Data

(60) Provisional application No. 60/450,155, filed on Feb. 26, 2003.

(51) Int. Cl.$^7$ .......................... G02B 23/08; G02B 23/22
(52) U.S. Cl. ...................... 359/404; 359/407; 359/433; 359/822
(58) Field of Search ................................ 359/822, 404, 359/405, 407, 409, 480, 481, 417, 433, 180

(56) References Cited

U.S. PATENT DOCUMENTS

| | | | |
|---|---|---|---|
| 4,809,942 A | 3/1989 | Kastendieck et al. | |
| 5,361,162 A | 11/1994 | Goebel | |
| 5,367,402 A * | 11/1994 | Holmes et al. | ............. 359/400 |
| 5,408,086 A * | 4/1995 | Morris et al. | ......... 250/214 VT |
| 5,416,922 A | 5/1995 | Horvat et al. | |
| 5,446,585 A * | 8/1995 | Morley et al. | ............. 359/411 |
| 5,469,578 A | 11/1995 | Mattes | |
| 5,535,053 A | 7/1996 | Baril et al. | |
| 5,703,354 A * | 12/1997 | Wannagot et al. | .... 250/214 VT |
| 6,310,721 B2 | 10/2001 | Carmi et al. | |
| 6,337,768 B1 | 1/2002 | Carmi et al. | |
| 6,339,500 B1 | 1/2002 | Carmi et al. | |
| 6,462,894 B1 | 10/2002 | Moody | |
| 6,493,137 B1 * | 12/2002 | Solinsky et al. | ............. 359/409 |
| 6,687,053 B1 * | 2/2004 | Holmes et al. | ............. 359/411 |

* cited by examiner

*Primary Examiner*—Ricky Mack
*Assistant Examiner*—Brandi Thomas
(74) *Attorney, Agent, or Firm*—RatnerPrestia

(57) ABSTRACT

A support for adjusting the line of sight of a night vision monocular. The support has a shelf that is supported relative to a user's eyes and a flange that is coupled to the shelf and rotatable relative to the shelf. The support also has a shaft supporting the monocular. The shaft is coupled to the flange for tilting the monocular relative to the shelf concurrently with a rotation of the flange. The support also has a tilt control means coupled to the flange for applying an axial force to the flange to control the rotation of the flange and the tilting of the monocular.

11 Claims, 5 Drawing Sheets

LINE OF SIGHT ADJUSTMENT FOR NIGHT VISION BINOCULARS

CROSS-REFERENCE TO RELATED APPLICATIONS

This application claims the benefit to U.S. Provisional Patent Application Ser. No. 60/450,155 filed Feb. 26, 2003, the contents of which are incorporated in this application by reference.

FIELD OF THE INVENTION

The present invention relates to a night vision device. More particularly, the present invention relates to a binocular night vision goggle for an aviator night vision imaging system that is able to maintain the line of sight during operation.

BACKGROUND OF THE INVENTION

A conventional binocular night vision device uses a pair of monocular night vision scopes which are mounted and associated with one another in such a way as to provide the user of the device with binocular vision, thereby allowing the user to have a night-time view with depth perception. FIG. 1 shows a night vision device 10 including a pair of night vision monoculars 12 which can be suspended in front of a user's eyes by an elongated shelf 14 which has a laterally rectangular shape in plan view, and is also of a generally rectangular shape in both frontal and side elevation views. Depending from the shelf 14 is a pair of spaced apart mounts 16 (best seen in FIG. 7b). FIG. 2a shows a top view of shelf 14 without the binocular mounted onto it. FIG. 2b shows a bottom view of shelf 14 without the binocular mounted to it.

The interpupillary distance (IPD) is defined as the distance between the user's pupils. In order to allow adjustment of the horizontal spacing between the monoculars 12 to match the interpupillary distance (IPD) of a user, an IPD adjustment mechanism moves the monoculars toward each other and away from each other. Part of the IPD mechanism is located on the outside of shelf 14 and part of it is located between walls of shelf 14. The walls are underneath shelf 14.

As shown in FIGS. 2b and 3, the underneath part of shelf 14 is divided into three sections 34, 36, 38 by four walls 18, 20, 22, and 24. A circular aperture is located inside each of the walls. Aperture 18a is located in wall 18, aperture 20a is located in wall 20, aperture 22a is located in wall 22, and aperture 24a is located in wall 24. Rotatably received in the apertures 18a, 20a, 22a, 24a are flanges 18b, 20b, 22b, and 24b of an eccentric shaft 26. Eccentric shaft 26 is a thin elongate blade portion. Inside each of the flanges 18b, 20b, 22b, 24b are off-center apertures 18c, 20c, 22c, and 24c. A pivot lever 28 of the eccentric shaft 26 is part of flange 18b and extends outwardly of one end of the shelf 14.

Rotatably received in apertures 18c and 20c is an IPD threaded shaft 30. A monocular (not shown) is mounted onto IPD threaded shaft 30. One end of IPD threaded shaft 30 extends through aperture 18c in flange 18b, which is in aperture 18a of wall 18. Consequently, this end of IPD threaded shaft 30 extends from the space in section 36 at the underside of shelf 14 to the outside of wall 18. The other end of IPD threaded shaft 30 extends through aperture 20c in flange 20b, which is in aperture 20a of wall 20. Consequently, this end of IPD threaded shaft 30 extends from space 36 at the underside of shelf 14 into the space in section 38 at the underside of shelf 14.

Rotatably received in apertures 22c and 24c is an IPD threaded shaft 32. Another monocular (not shown) is mounted onto IPD threaded shaft 32. One end of IPD threaded shaft 32 extends through aperture 24c in flange 24b, which is in aperture 24a of wall 24. Consequently, this end of IPD threaded shaft 32 extends from the space in section 34 at the underside of shelf 14 to the outside of wall 24. The other end of IPD threaded shaft 32 extends through aperture 22c in flange 22b, which is in aperture 22a of wall 22. Consequently, this end of IPD shaft 32 extends from space 34 at the underside of shelf 14 into the space in section 38 at the underside of shelf 14.

The end of IPD threaded shaft 32 that extends into space 38 from space 34 is threaded and carries a washer member 40 which is secured axially on the IPD threaded shaft 32 by a threaded nut 42. Consequently, IPD threaded shaft 32 cannot move out of aperture 22c in flange 22b. The end of IPD threaded shaft 30 that extends into space 38 from space 36 is threaded and carries a washer member (not shown) which is secured axially on the IPD threaded shaft 30 by a threaded nut (not shown). Consequently, IPD threaded shaft 30 cannot move out of aperture 20c in flange 20b.

The end of IPD threaded shaft 32 that extends from space 34 to the outside of wall 24 is attached to a control knob 40. The end of IPD threaded shaft 30 that extends from space 36 to the outside of wall 18 is attached to a control knob 42. Each of the monoculars is respectively coupled to the IPD shafts 30 and 32. Control knobs 40 and 42 may be rotated independently of each other. When control knobs 42 and 40 are rotated, they may respectively cause IPD shafts 30 and 32 to rotate thereby moving the monoculars toward and away from each other to adjust for varying eye separations.

As explained above, lever 28 is part of flange 18b. Each of the flanges are connected together by the eccentric shaft 26. Each of the flanges has an off-center aperture. Off-center apertures 18c and 20c receive IPD threaded shaft 30 and off-center apertures 22c and 24c receive IPD threaded shaft 32. Rotation of lever 28 rotates eccentric shaft 26, flanges 18b, 20b, 22b, and 24c, shaft 30 and shaft 32 relative to shelf 14. Since each of monoculars are coupled to shafts 30 and 32, rotation of lever 28 tilts each of the monoculars relative to shelf 14 and relative to a user's eyes. Thus, the main purpose of the eccentric shaft 26 and its associated flanges is to provide a means of tilting the line-of-sight of the two monoculars simultaneously. The lever may be used to adjust the tilt of the monoculars to align with the user's line-of-sight.

As shown in FIG. 3, the conventional eccentric shaft uses an o-ring 46 to provide rotational friction between the eccentric shaft 26 and the shelf 14. The o-ring 46 is placed in a groove 18d of flange 18b, near adjustment lever 28. After the eccentric shaft is assembled to the shelf assembly, the purpose of the o-ring is to provide frictional resistance against the shelf. The rotational friction force occurs between o-ring 46 and aperture 18a of wall 18 when flange 18b is inserted into aperture 18a. Thus, the o-ring acts as a frictional resistor between the eccentric shaft and the shelf. The frictional interface between o-ring 46 and aperture 18a is controlled by tight tolerances between flange 18b of the eccentric shaft 26, the shelf 14, and the o-ring 46. One of the purposes of the rotational friction provided by the o-ring is to minimize or prevent the night vision binocular from inadvertently tilting because of vibration during operation. Another purpose is to provide a smooth resistance during adjustment.

However, it is possible for the eccentric shaft to rotate during vibration and overcome the frictional resistance provided by the o-ring. This can cause the night vision goggles' optical axis to tilt downward.

It is therefore necessary to provide a design that prevents, or at least better inhibits, the eccentric shaft from rotating during operation.

SUMMARY OF THE INVENTION

A support for adjusting the line of sight of a night vision monocular. The support has a shelf that is supported relative to a user's eyes and a flange that is coupled to the shelf and rotatable relative to the shelf. The support also has a shaft supporting the monocular. The shaft is coupled to the flange for tilting the monocular relative to the shelf concurrently with a rotation of the flange. The support also has a tilt control means coupled to the flange for applying an axial force to the flange to control the rotation of the flange and the tilting of the monocular.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1:
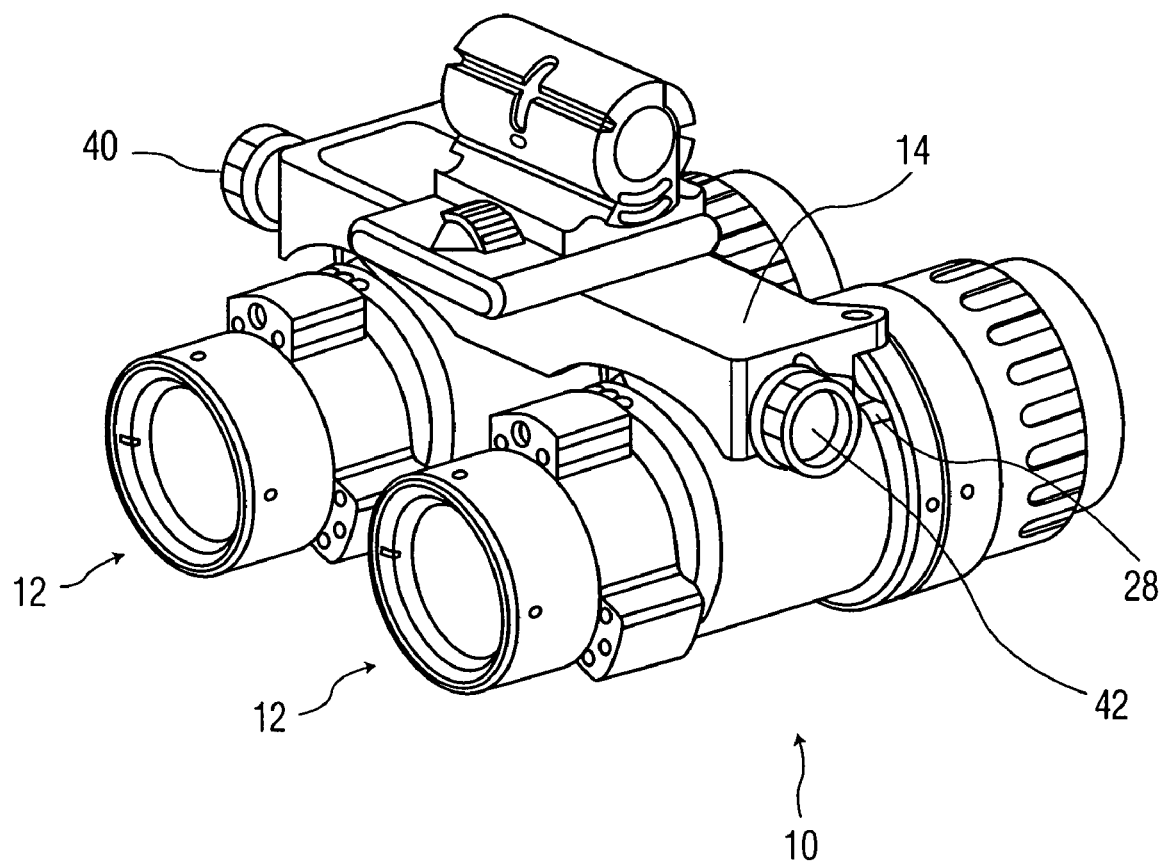
FIG. 1 is a perspective view of a prior art binocular night vision goggle.
Figure 2A:
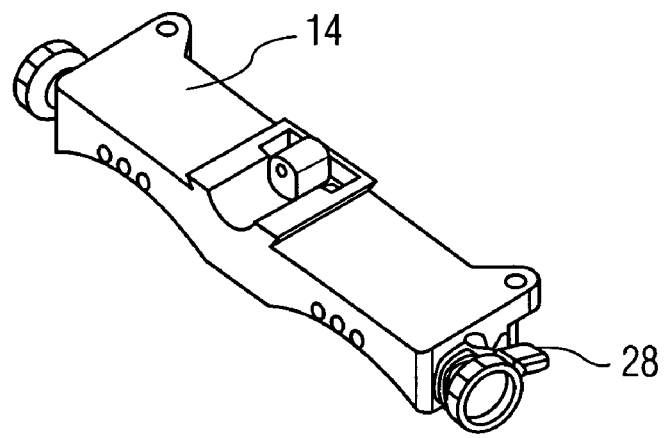
FIG. 2a is a top perspective view of a prior art shelf for supporting a binocular night vision goggle.
Figure 2B:
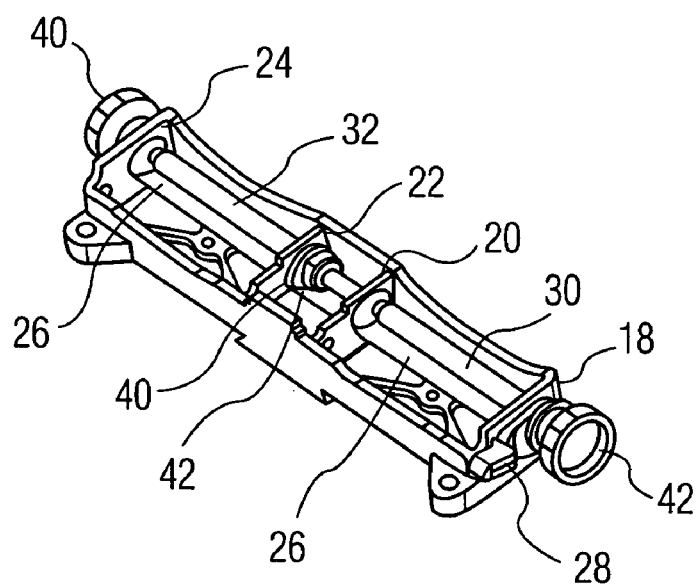
FIG. 2b is a bottom perspective view of a prior art shelf for supporting a binocular night vision goggle.
Figure 3:
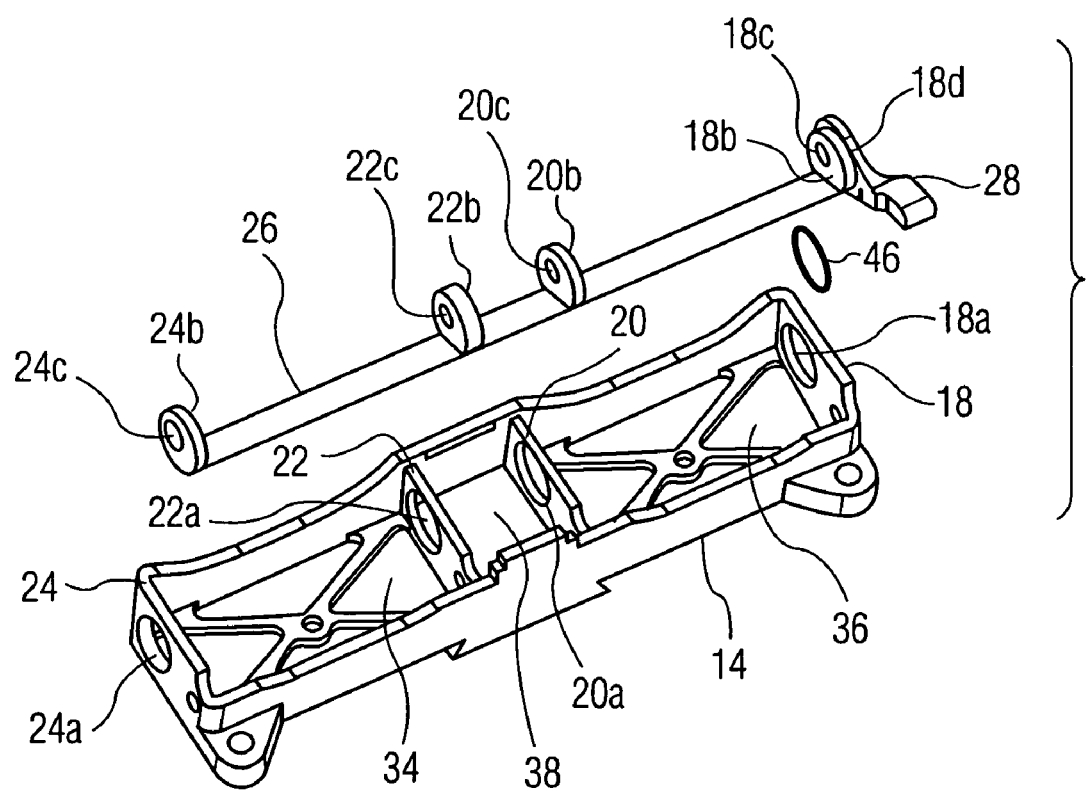
FIG. 3 is an exploded perspective view of a prior art shelf, eccentric shaft, and o-ring.
Figure 4:
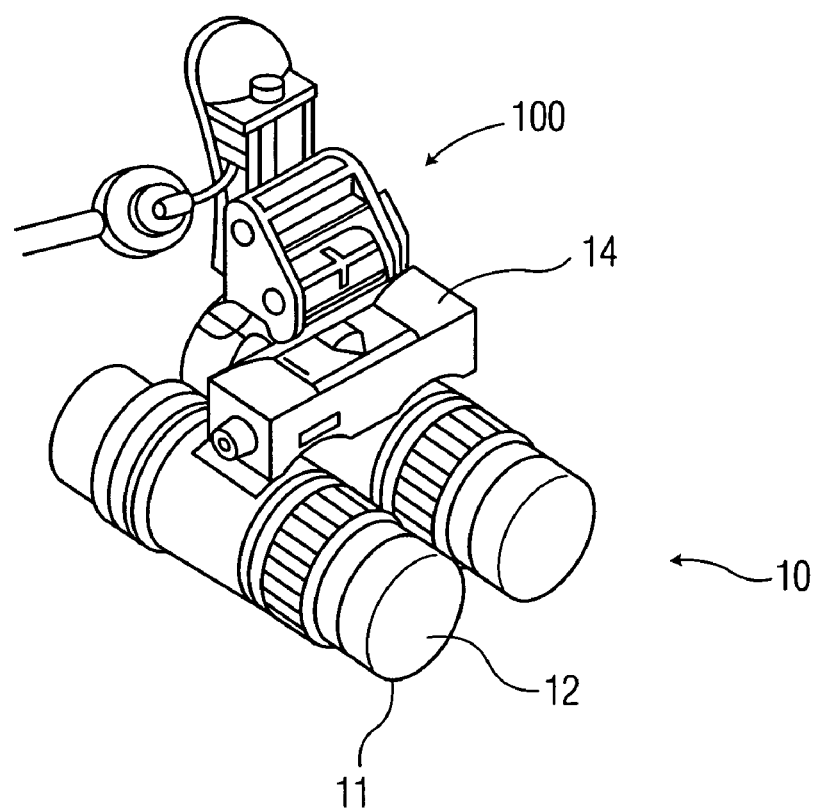
FIG. 4 is a perspective view of a binocular night vision goggle showing brackets for attaching a heads-up display assembly.
Figure 5:
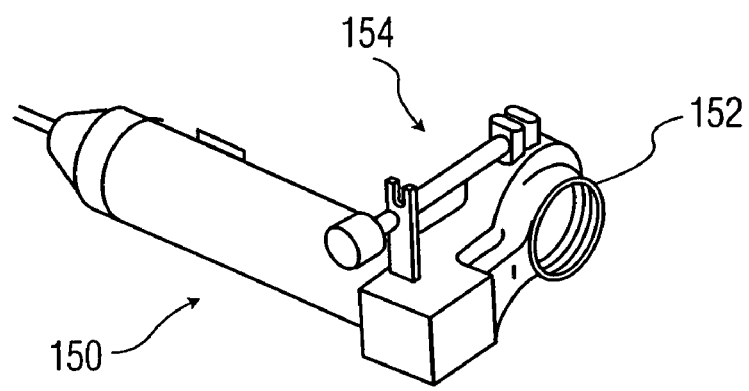
FIG. 5 is a perspective view of a heads-up assembly that may be attached to a binocular night vision assembly.

The problems with the conventional device are intensified when a Heads-Up Display (HUD) is attached to the monocular's objective lens during use. FIG. 4 shows night vision binoculars 10 with a heads up display 100 mounted on top of shelf 14. Heads up display 100 is centered on shelf 14. Therefore, heads up display 100 does not cause the shelf to tilt during operations. FIG. 5 shows a second type of heads up display 150 that can be attached to the night vision binoculars. Heads up display 150 includes an adjustable circular frame 152 which may fit over objective 11 of a night vision monocular 10. Adjustable circular frame 152 may be affixed to objective 11 with bolt and nut configuration 154. HUD 150 is therefore attached to the front of the objective end of monocular 12 and part of the HUD extends out over the front of the objective end of the night vision goggle. These two aspects of the HUD result in additional weight and additional downward force components that must be restrained.

In the prior art device, the eccentric shaft is assembled by inserting an eccentric shaft into the shelf and then fastening the IPD threaded shafts to the shelf assembly using locking nuts. The eccentric shaft is held to the shelf assembly by the IPD threaded shaft and locking nut. The torque placed on the IPD threaded shaft and locking nut, and likewise on the eccentric shaft, can be inconsistent depending on the torque applied by the person assembling the device. The result of this method of assembling the shelf to the IPD threaded shaft is that either the IPD or line-of-sight tilt can be altered by an adjustment of one of these components. That is, the IPD can change by adjusting the line-of-sight and the line-of-sight can change by adjusting the IPD. This alteration of adjustment in either IPD or line-of-sight tilt is undesirable since one adjustment should not alter another inadvertently. The tendency of the line-of-sight to change is increased by the weight added by HUD 154.

The present invention overcomes the aforementioned difficulties caused by the HUD by adding the capability for the eccentric shaft to be assembled to the shelf independent of the IPD threaded shafts and locking nuts. That is, the IPD threaded shafts and locking nuts are not needed to hold the eccentric shaft to the shelf. The main connection force is applied through a nut and washer that is located on the outside of the shelf.

The method of assembly also allows a settable force to be applied axially to the eccentric shaft, thereby increasing the friction between the eccentric shaft and the shelf. The additional friction helps to prevent the possibility of the night vision goggles' monoculars from inadvertently changing the line-of-sight tilt adjustment during operations, even when a HUD is attached to one of the night vision goggles' objectives. This solution also reduces the possibility of the line-of-sight tilt adjustment from changing due to IPD adjustment. This is due to the increased torque between the eccentric shaft and the shelf.

The solution involves a modification of the eccentric shaft and the inclusion of a tilt control means comprising two additional parts, a spring washer and a locking nut. The incorporation of these additional components greatly improves the ability of the eccentric shaft to hold the desired line-of-sight during vibrations. The improved eccentric shaft design overcomes the problems of the prior art by providing a settable force level between the eccentric shaft and the shelf.

Figure 6:
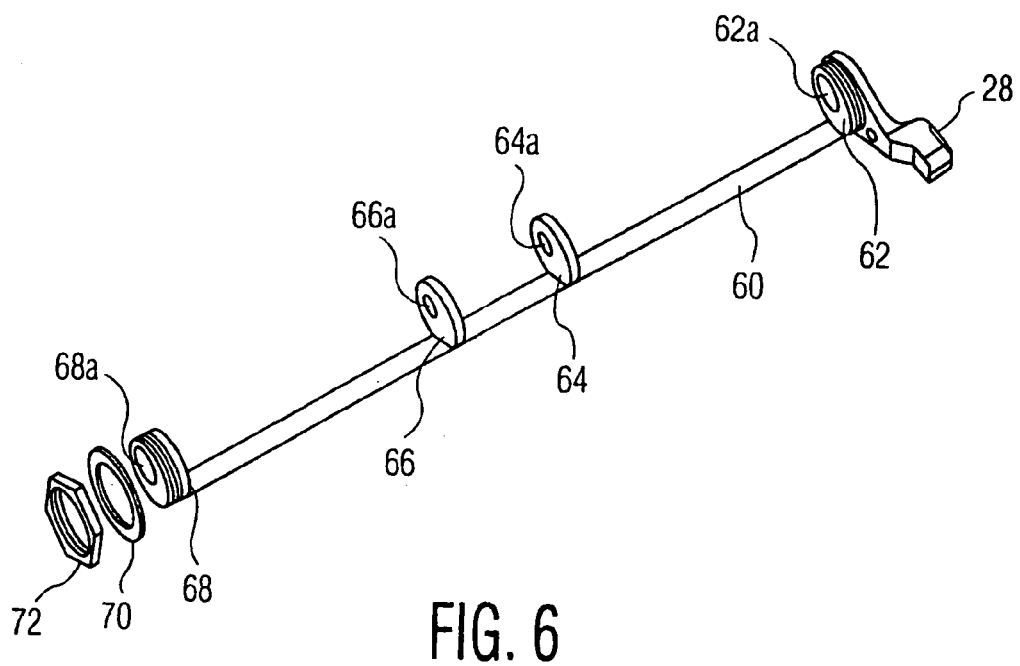
FIG. 6 is a perspective view of an eccentric shaft with improved means to couple the eccentric shaft to the shelf.
Figure 7A:
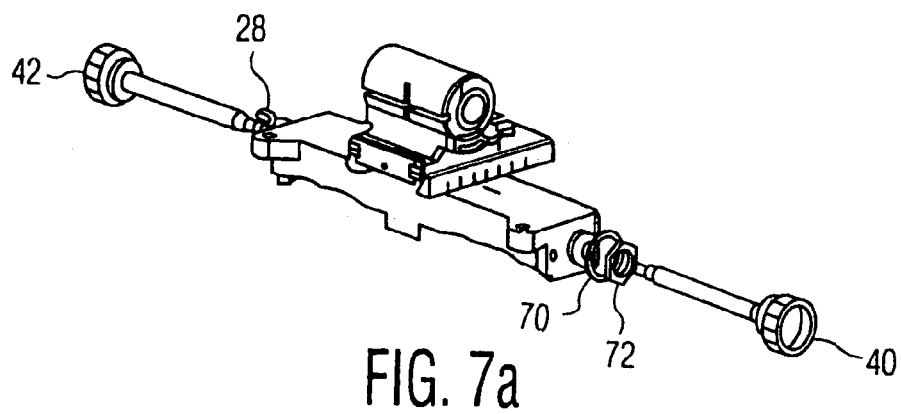
FIG. 7a is a perspective view of the shelf, part of the heads-up display, and the improved means to couple the eccentric shaft to the shelf.
Figure 7B:
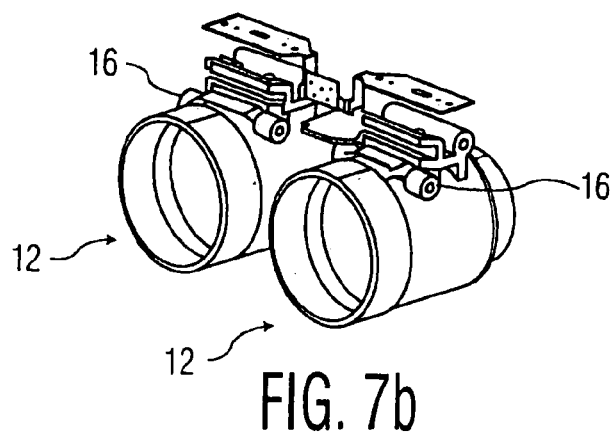
FIG. 7b is a perspective view showing how the binocular night vision assembly is coupled to the shelf and part of the heads-up display.

Referring to FIG. 6, an eccentric shaft 60 is shown having four round flanges 62, 64, 66, 68, having off-center apertures 62a, 64a, 66a, 68a. The length of eccentric shaft 60 is the same as the length of eccentric shaft 26 in the prior art. Therefore, eccentric shaft 60 may be used with the prior art shelf 14. The shape and diameters of flanges 62, 64, 66, and 68 are the same as apertures 18a, 20a, 22a, and 24a. Therefore, flanges 62, 64, 66, and 68 may also be used with the prior art shelf 14. Flange 68 of eccentric shaft 60 is the flange located at the far end of the eccentric shaft away from lever 28. It has the same shape and diameter as flange 24b in the prior art and therefore may be inserted into aperture 24a.

Flange 68 is made thicker than flange 24b had been in the prior art. Because the thickness of flange 68 has been increased compared to the prior art, the thickness of flange 66 has been decreased in comparison to flange 22b in the prior art. The amount of decreased thickness of flange 66 is equal to the amount of increased thickness of flange 68. The thickness of flange 66 matches the width of wall 22. The incorporation of offsetting thicknesses allows the length of eccentric shaft 60 to remain the same as the length of eccentric shaft 26 so that the improved eccentric shaft may be incorporated into a conventional shelf. Flange 68 is threaded and is made thick enough so that the threads protrude outside of wall 24.

During the assembly of the eccentric shaft to the shelf, a spring washer 70 and a locking nut 72 are added to the threaded surface of flange 68. Washer 70 is placed over the threads of flange 68 that extend outside of wall 24 and abuts wall 24. Nut 72 threads onto the threads on flange 68 and abuts washer 70. Therefore, washer 70 is placed between wall 24 and nut 72. In an exemplary embodiment, the spring washer may be a wave washer, a Belleville washer or other locking washer. In an alternative embodiment, the shelf may be made out of plastic and the plastic shelf may be used as a spring mechanism.

In the conventional shelf and flange, the flexibility of the o-ring changed over time, becoming hard in cold weather and soft in warm weather. In addition, it was subject to wear over time. In addition, the torque placed on the IPD threaded shaft, locking nut, and eccentric shaft was inconsistent because it depended on the torque applied by the person assembling the unit. In the present invention, the locking nut and the washer place a consistent strong frictional force between the locking and the washer during the rotation of the eccentric shaft in relation to the shelf. The spring washer limits the variation of tension and force over time despite the presence of varying environmental conditions. The new method of retention allows a settable force to be applied axially to the eccentric shaft thereby increasing the friction between the eccentric shaft and the shelf. This additional friction helps to prevent the possibility of the night vision goggles' monoculars from inadvertently changing the line-of-sight tilt adjustment during operations, even when a HUD is attached to one or more of the night vision goggles' objectives.

Washer 70 prevents wall 24 from wearing out over time from the rotation of nut 72, as it is rotated by lever 28 and the eccentric shelf. If wall 24 were allowed to wear, the tension applied to the eccentric shaft and to wall 24 of the shelf would be changed dramatically over time. Instead, the washer absorbs all of the rotational friction that is applied by nut 72 and little or no rotational friction is applied to wall 24.

In an exemplary embodiment, the eccentric shaft may be assembled to the shelf without an o-ring on flange 62. In an alternative embodiment, the eccentric shaft may be assembled to the shelf with an o-ring on flange 62.

In the conventional design, the force needed to rotate lever 28 on the eccentric shaft once the eccentric shaft is assembled to the shelf is approximately 0.7 pounds. In the design disclosed herein, the forced needed to rotate lever 28 is in a range of 2.4 to 3.5 pounds. Accordingly, the present invention has increased the force needed to rotate the eccentric shaft approximately three to five times. This increase in needed force is an important factor in preventing the inadvertent changing of the line-of-sight adjustment once it is set.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. For example, the invention may be applied to a night vision monocular, to a monocular that may be used during daylight or other conditions that are not dark, and to a binocular that may be used during daylight or other conditions that are not dark.

What is claimed is:

1. A support for adjusting the line of sight of a night vision monocular, the support comprising:
    a shelf for being supported relative to a user's head and eyes;
    a flange coupled to the shelf, the flange being rotatable relative to the shelf;
    a shaft supporting the monocular, the shaft being coupled to the flange for tilting the monocular relative to the shelf concurrently with a rotation of the flange;
    a tilt control means coupled to the flange for applying an axial force to the flange to control the rotation of the flange and the tilting of the monocular.

2. The support of claim 1, wherein the shelf includes a wall between the monocular and the tilt control means, and the tilt control means includes a threaded nut and a washer disposed on the flange, the washer being located between the nut and the wall.

3. A support for adjusting the line of sight of night vision binoculars including a pair of night vision monoculars, the support comprising:
    a shelf for being supported relative to a user's eyes;
    a flange coupled to the shelf, the flange being rotatable relative to the shelf
    a pair of shafts, each shaft supporting a respective one of the pair of monoculars and being coupled to the flange for tilting the pair of monoculars
    a tilt control means for applying an axial force to the flange to control the rotation of the flange and the tilting of the pair of monoculars.

4. The support of claim 3, wherein the shelf includes a wall between one monocular of the pair of binoculars and the tilt control means, and the tilt control means includes a threaded nut and a washer disposed on the flange, the washer being located between the nut and the wall.

5. A device for adjusting the line of sight of a monocular, the device comprising:
    a support for the monocular, the support including a shelf and a first shaft coupled to the monocular for tilting the monocular relative to the shelf;
    a rotatable flange positioned in an aperture in the shelf, the rotatable flange having a second aperture for receiving the first shaft;
    a second shaft coupled to the flange for rotating the flange;
    a tilt control means for controlling the rotation of the flange, the first shaft, and the monocular relative to the support by applying an axial force to the flange.

6. The device of claim 5, wherein the flange is threaded, the tilt control means includes a threaded nut, and the threaded nut is threaded onto the threaded flange.

7. The device of claim 5, wherein the rotatable flange has a first threaded portion positioned in the aperture in the shelf and a second threaded portion protruding from the shelf, the tilt control means being coupled to the second threaded portion.

8. The device of claim 7, wherein the tilt control means is threaded onto the second threaded portion.

9. A support for adjusting the line of sight of a night vision monocular, the support comprising:
- a shelf supported relative to a user's head and eyes;
- a flange coupled to the shelf, the flange being rotatable relative to the shelf;
- a shaft supporting the monocular, the shaft being coupled to the flange for tilting the monocular relative to the shelf concurrently with a rotation of the flange;
- a tilt controller coupled to the flange applying an axial force to the flange to control the rotation of the flange and the tilting of the monocular.

10. A support for adjusting the line of sight of night vision binoculars including a pair of night vision monoculars, the support comprising:
- a shelf supported relative to a user's eyes;
- a flange coupled to the shelf, the flange being rotatable relative to the shelf
- a pair of shafts, each shaft supporting a respective one of the pair of monoculars and being coupled to the flange for tilting the pair of monoculars
- a tilt controller applying an axial force to the flange to control the rotation of the flange and the tilting of the pair of monoculars.

11. A device for adjusting the line of sight of a monocular, the device comprising:
- a support for the monocular, the support including a shelf and a first shaft coupled to the monocular for tilting the monocular relative to the shelf;
- a rotatable flange positioned in an aperture in the shelf, the rotatable flange having a second aperture for receiving the first shaft;
- a second shaft coupled to the flange for rotating the flange;
- a tilt controller for controlling rotation of the flange, the first shaft, and the monocular relative to the support by applying an axial force to the flange.

* * * * *